United States Patent
Nakamura et al.

(10) Patent No.: US 10,469,677 B2
(45) Date of Patent: Nov. 5, 2019

(54) IMAGE FORMING APPARATUS

(71) Applicant: Sharp Kabushiki Kaisha, Osaka (JP)

(72) Inventors: Yasushi Nakamura, Osaka (JP); Osamu Kawata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/854,842

(22) Filed: Dec. 27, 2017

(65) Prior Publication Data

US 2018/0124263 A1    May 3, 2018

Related U.S. Application Data (63) Continuation of application No. 15/290,095, filed on Oct. 11, 2016, now Pat. No. 9,888,138.

(30) Foreign Application Priority Data

Oct. 20, 2015  (JP) ................ 2015-206013

(51) Int. Cl.
 *H04N 1/00* (2006.01)
(52) U.S. Cl.
 CPC ..... *H04N 1/00384* (2013.01); *H04N 1/00411* (2013.01); *H04N 1/00551* (2013.01); *H04N 1/00888* (2013.01); *H04N 2201/0094* (2013.01)
(58) Field of Classification Search
 CPC .......... H04N 1/00384; H04N 1/00411; H04N 2201/0094; H04N 1/00888; H04N 1/00551
 USPC ........................................ 358/1.15
 See application file for complete search history.

(56) References Cited

U.S. PATENT DOCUMENTS

| | | | |
|---|---|---|---|
| 9,036,167 B2 | 5/2015 | Ogino et al. | |
| 2006/0170831 A1 | 8/2006 | Muraki | |
| 2009/0059317 A1* | 3/2009 | Ito | H04N 1/00496 358/474 |
| 2011/0199637 A1 | 8/2011 | Yoshida et al. | |
| 2011/0235110 A1* | 9/2011 | Tani | G03G 15/00 358/1.15 |
| 2012/0243042 A1 | 9/2012 | Uchida | |

(Continued)

FOREIGN PATENT DOCUMENTS

| CN | 102164221 A | 8/2011 |
|---|---|---|
| CN | 203870570 U | 10/2014 |

(Continued)

OTHER PUBLICATIONS

Allowed Claims from U.S. Appl. No. 15/290,095, filed Oct. 11, 2016.

*Primary Examiner* — Saeid Ebrahimi Dehkordy
(74) *Attorney, Agent, or Firm* — Renner, Otto, Boisselle & Sklar, LLP (57) ABSTRACT

An image forming apparatus comprises an image reading portion, and an operation unit having at least a touch panel display is provided in a front side of the image reading portion. A housing of the image reading portion has a housing projection portion that is projected frontward as compared with a front surface of a document pressing cover, and a power key that is a hardware key is provided on an upper surface of the housing projection portion in a back side as compared with the touch panel display and within a range of a breadth of the operation unit. Accordingly, it is possible to prevent the power key from being operated carelessly, and it becomes easy to recognize a position of the power key.

6 Claims, 8 Drawing Sheets

(56) References Cited

U.S. PATENT DOCUMENTS

2014/0195955 A1    7/2014   Okada
2015/0242026 A1    8/2015   Nakamura et al.
2015/0346672 A1* 12/2015   Nakamura ......... G03G 15/5075
                                                                 399/88

FOREIGN PATENT DOCUMENTS

| JP | H6-230623 | 8/1994 |
| JP | 2004-082477 | 3/2004 |
| JP | 3116757 | 11/2005 |
| JP | 2006-218650 | 8/2006 |
| JP | 2009-267588 | 11/2009 |
| JP | 2011-170070 A | 9/2011 |
| JP | 2014-112353 A | 6/2014 |

* cited by examiner

IMAGE FORMING APPARATUS

CROSS REFERENCE OF RELATED APPLICATION

This application is a continuation of U.S. application Ser. No. 15/290,095, filed on Oct. 11, 2016, the entire disclosure of which is incorporated herein by reference.

The disclosure of Japanese patent application No. 2015-206013 filed on Oct. 20, 2015 is incorporated by reference.

BACKGROUND OF THE INVENTION

Field of the Invention

The present invention relates to an image forming apparatus, and more specifically, an image forming apparatus comprises an operation unit having at least a touch panel display on an upper surface thereof in a front side of an image reading portion.

Description of the Related Art

An example of a conventional image forming apparatus is disclosed in Japanese patent application laying-open No. 2011-170070 [G03G21/00, H04M 11/00, B41J 29/00, B41J 29/38] (Literature 1) laid-open on Sep. 1, 2011. An image forming apparatus disclosed in the literature 1 comprises an operation unit provided in a front side of an image reading portion, and a touch panel display (touch sensitive key) and hardware keys such as a power key, a power saving key, a home key, a ten key, etc. are provided on an upper surface of this operation unit. If various kinds of operation keys are arranged on a single operation unit as the image forming apparatus of the literature 1, the power key is indistinguishable from other operation keys, and it is hard to recognize importance of the power key. Accordingly, there is an occasion that a user operates the power key carelessly (unconsciously) in a series of flows to operate other operation keys such as the touch panel display. When the power key is operated by mistake, it is inconvenient because it takes time until the apparatus is rebooted.

On the other hand, another example of an image forming apparatus comprising an operation device provided in a front side of an image reading portion is disclosed in Japanese patent application laying-open No. 2014-112353 [G06F 3/02, H01H 13/02, H03M 11/04, G06F 3/023, G06F 3/041] (Literature 2) laid-open on Jun. 19, 2014. The operation device provided in the image forming apparatus of the literature 2 has a first operation portion provided in a tiltable manner and a second operation portion fixed in an untiltable manner. Then, the first operation portion is provided with a touch panel display and a home key that is a capacitance type key, and the second operation portion is provided with a power key and a power saving key that are mechanical keys. By thus using a mechanical key for the power key and power saving key that are relatively important keys, and by arranging these mechanical keys to the second operation portion that is fixed and untiltable, an erroneous operation of an important operation key can be prevented.

However, in the image forming apparatus of the literature 2, since the touch panel display, the home key, the power saving key and the power key are arranged to be spread in a lateral direction (left-right direction), the power key cannot enter easily in an effective field of view of a user. Accordingly, there is an occasion that a user is unable to recognize the position of the power key easily.

SUMMARY OF THE INVENTION

Therefore, it is a primary object of the present invention to provide a novel image forming apparatus.

It is another object of the present invention to provide an image forming apparatus that it is possible to prevent a power key from being operated carelessly and a position of the power key can be recognized easily.

The present invention, in order to solve the above problems, adopts the following configurations.

A first invention is an image forming apparatus that comprises an image reading portion, a document pressing cover that is openably provided on an upper surface of the image reading portion, and an operation unit that is provided in a front side of the image reading portion, wherein the operation unit has at least a touch panel display on an upper surface thereof, and a housing of the image reading portion has a housing projection portion that is projected frontward as compared with a front surface of the document pressing cover, and the image forming apparatus further comprises a power key that is a hardware key and provided on an upper surface of the housing projection portion in a back side as compared with the touch panel display and within a range of a breadth of the operation unit.

In the first invention, the image forming apparatus comprises the image reading portion. The document pressing cover is provided on the upper surface of the image reading portion in a manner that it is freely opened and closed, and the operation unit having at least the touch panel display on the upper surface thereof is provided in the front side of the image reading portion. Furthermore, the housing of the image reading portion has the housing projection portion that is projected frontward as compared with the front surface of the document pressing cover, and the power key that is a hardware key is provided on the upper surface of the housing projection portion in the back side as compared with the touch panel display and within the range of the breadth (a width in a lateral direction) of the operation unit. Thus, by forming the housing projection portion on the housing of the image reading portion to provide the power key on the upper surface thereof, and by providing the touch panel display on the operation unit that is a separate unit from the image reading portion, it becomes easy for a user to recognize importance of the power key, and therefore, it is possible to prevent the power key from being operated carelessly. Furthermore, by providing the power key in the back side as compared with the touch panel display and within the range of the breadth of the operation unit, the power key becomes to be located in a front side of a line of sight direction of the user, and thus, to easily enter in an effective field of view of the user.

According to the first invention, it is possible to prevent the power key from being operated carelessly, and it becomes easy to recognize a position of the power key. Therefore, operability of the image forming apparatus improves.

A second invention is the image forming apparatus according to the first invention. In the second invention, the upper surface of the housing projection portion is made into a level surface, i.e., a surface parallel to a document placing table of the image reading portion.

A third invention is the image forming apparatus according to the first invention. In the third invention, the operation unit has, in addition to the touch panel display, a hardware key such as a home key, etc. on the upper surface thereof. Then, the power key and the hardware key that is provided on the operation unit are arranged in line in a front-back direction. By thus arranging the hardware keys in line in the front-back direction, it becomes easier for the user to recognize the position of the power key.

A fourth invention is the image forming apparatus according to the first invention. In the fourth invention, the upper surface of the operation unit is an inclined surface that is inclined front-downwardly with respect to the upper surface of the housing projection portion. That is, the surface that is provided with the touch panel display is inclined to the surface that is provided with the power key. Accordingly, since it becomes easier for a user to recognize the importance of the power key, it is possible to more surely prevent the power key from being operated carelessly.

A fifth invention is the image forming apparatus according to the first invention. In the fifth invention, a level difference is formed between the upper surface of the housing projection portion and the upper surface of the operation unit, and the upper surface of the operation unit is arranged in a position lower than the upper surface of the housing projection portion. By thus forming the level difference between the upper surface of the housing projection portion and the upper surface of the operation unit, it becomes easier for a user to recognize the importance of the power key. Furthermore, it is possible to prevent the power key from being operated carelessly in a series of flows to operate other operation keys on the operation unit since it is interfered by this level difference. Therefore, it is possible to more surely prevent the power key from being operated carelessly.

A sixth invention is the image forming apparatus according to the fifth invention. In the sixth invention, a front surface of the housing projection portion has a downwardly inclined surface that comes in a back side as it goes downward, i.e., a lower end becomes a back side as compared with an upper end. Then, the operation unit is arranged so that a back end portion thereof comes beneath the inclined surface of the housing projection portion. Although it is clear that the image reading portion and the operation unit are separate units, a feeling of unity occurs by this, and therefore, an aesthetic sense of the image forming apparatus improves.

A seventh invention is the image forming apparatus according to the fifth invention. In the seventh invention, the front surface of the housing projection portion has a depression portion. Then, the operation unit is arranged so that a back end portion thereof comes in the depression portion of the housing projection portion, i.e., comes beneath the depression portion or enters into the depression portion. Although it is clear that the image reading portion and the operation unit are separate units, a feeling of unity occurs by this, and therefore, an aesthetic sense of the image forming apparatus improves.

The above described objects and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

First Embodiment

Figure 1:
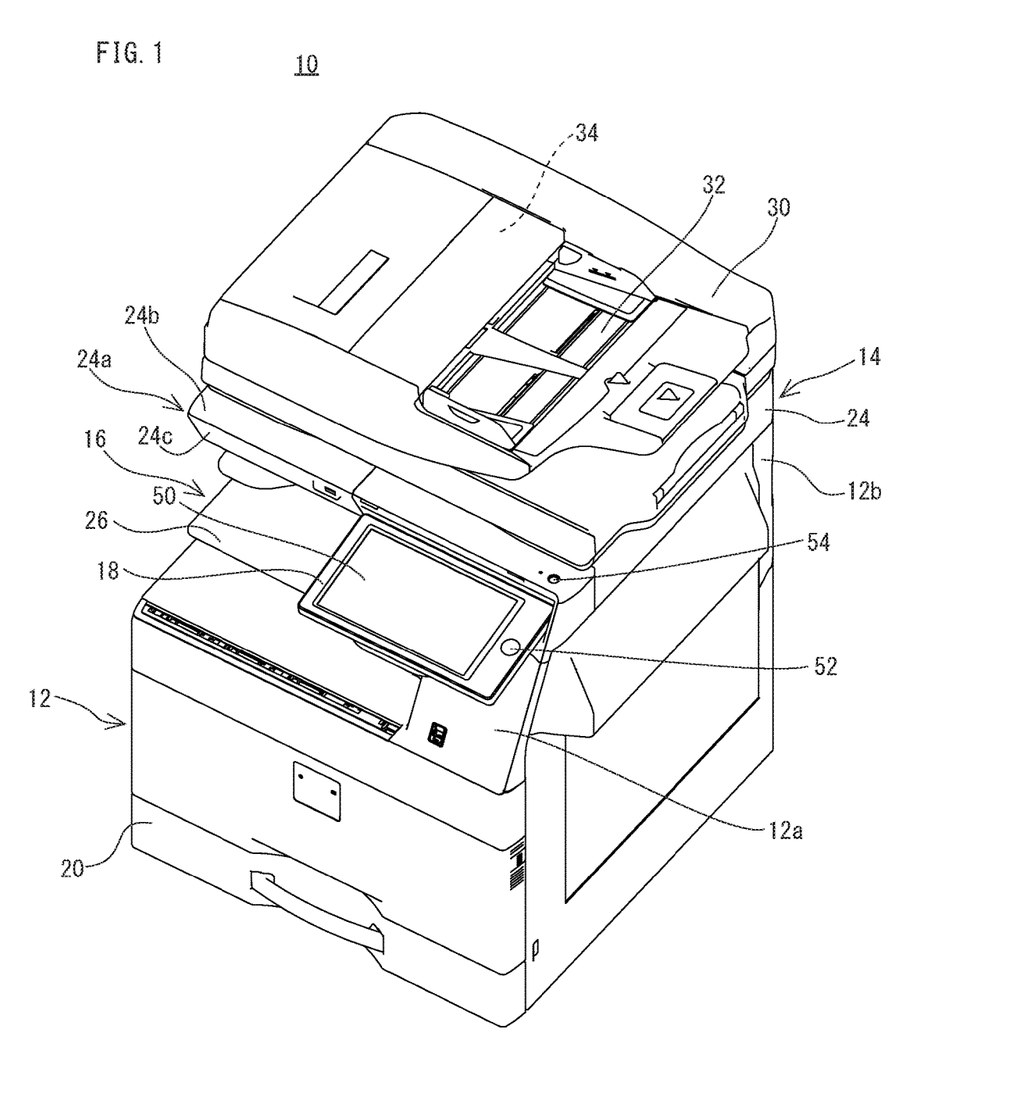
FIG. 1 is a perspective view showing an appearance of an image forming apparatus of a first embodiment according to the present invention.

With reference to FIG. 1, an image forming apparatus 10 that is an embodiment according to the present invention is an image forming apparatus of an in-barrel sheet discharge type that an in-barrel sheet discharge portion 16 is formed between an image forming portion 12 and an image reading portion 14, and the image forming apparatus 10 comprises an operation unit 18 that is provided as a separate unit in a front side of the image reading portion 14. As described later, the image forming apparatus 10 forms, based on image data etc. read by the image reading portion 14, a multicolor or monochromatic image to a predetermined sheet (recording medium), and discharges the sheet having been formed with the image to the in-barrel sheet discharge portion 16. In the first embodiment, the image forming apparatus 10 is a multifunction peripheral (MFP) that has a copying function, a printer function, a scanner function, a facsimile function, etc.

In addition, in this specification, a front-back direction (a depth direction) as for the image forming apparatus 10 and its structural members is defined on the assumption that a surface opposite to a standing position of a user, i.e., a surface in a side provided with the operation unit 18 is a front surface (a front side), and a left-right direction (a lateral direction) as for the image forming apparatus 10 and its structural members is defined on the basis of a state where the image forming apparatus 10 is viewed from the user.

First, basic structure of the image forming apparatus 10 will be described. As shown in FIG. 1-FIG. 4, the image forming apparatus 10 comprises the image forming portion 12 and the image reading portion 14 provided above the image forming portion 12.

A housing of the image forming portion 12 includes a first coupling housing 12a formed in a right side upper part and a second coupling housing 12b formed in a back side upper part, and the image reading portion 14 is supported by these first coupling housing 12a and the second coupling housing 12b. Accordingly, the in-barrel sheet discharge portion 16 that is an in-barrel space where sheets each having been formed with an image are stored is formed in an undersurface side of the image reading portion 14. Furthermore, a front surface 24c of the housing 24 of the image reading portion 14 is located in a back side as compared with a front surface of the housing of the image forming portion 12, and a front surface of the first coupling housing 12a is formed in an inclined surface that a lower end is projected frontward as compared with an upper end.

The image forming portion 12 comprises an exposure unit, a developer, a photoreceptor drum, a charger, an intermediate transfer belt, a transfer roller, a fixing unit, etc. The image forming portion 12 forms an image with an electrophotographic system onto a sheet that is fed from a sheet cassette 20 etc. arranged below. More specifically, the image forming portion 12 forms an electrostatic latent image according to image data on the photoreceptor drum by the charger, the exposure unit, etc., and visualizes the electrostatic latent image on the photoreceptor drum with a toner by the developer. Furthermore, a toner image formed on the photoreceptor drum is transferred onto the sheet by the intermediate transfer belt, the transfer roller, etc., and the toner image transferred to the sheet is thermally fixed by the fixing unit. Subsequently, the sheet having been formed with an image is discharged from a discharge port 22 that is formed on the first coupling housing 12a to the in-barrel sheet discharge portion 16. In addition, image data for forming an image on a sheet may be image data that is read by the image reading portion 14, image data that is transmitted from an external computer, etc.

The image reading portion 14 comprises a housing 24 that has a document placing table that is formed of transparent material on its upper surface. In this housing 24, a light source, a plurality of mirrors, a focusing lens, a line sensor, etc. are provided. The image reading portion 14 exposes a document surface by the light source, and leads a reflection light reflected from the document surface to the focusing lens by the plurality of mirrors. Then, the reflection light is focused onto light receiving elements of the line sensor by the focusing lens. In the line sensor, the brightness and chromaticity of the reflection light that is focused on the light receiving elements are detected, and image data based on the image on the document surface is produced. As the line sensor, a CCD (Charge Coupled Device) or a CIS (Contact Image Sensor) is used.

As for the in-barrel sheet discharge portion 16, a bottom surface and a top surface are partitioned with the housing of the image forming portion 12 and the housing 24 of the image reading portion 14, respectively, and a right side surface and a back side surface are partitioned with the first coupling housing 12a and the second coupling housing 12b. That is, a front side and a left side of the in-barrel sheet discharge portion 16 are opened. Furthermore, the in-barrel sheet discharge portion 16 is provided with a discharge tray 26 for receiving the sheet that is formed with the image and discharged from the discharge port 22.

Furthermore, a document pressing cover 30 is openably attached to the upper surface of the image reading portion 14 via a hinge etc. being arranged in a back side. This document pressing cover 30 is provided with an ADF (automatic document feeder) 34 that automatically feeds a document placed on a document placing tray 32 to an image reading position in the image reading portion 14 one by one.

Moreover, in this first embodiment, the housing 24 of the image reading portion 14 has a housing projection portion 24a that is projected frontward as compared with a front surface of the document pressing cover 30. That is, a front end portion of the housing 24 is projected frontward as compared with the front surface of the document pressing cover 30. Then, the operation unit 18 is provided in a front side of the housing 24 of this image reading portion 14. Specific structure of the operation unit 18 and the housing projection portion 24a will be described later.

Furthermore, although illustration is omitted, a control portion that controls operations or actions respective components or portions of the image forming apparatus 10 is provided in a predetermined position of the image forming apparatus 10. The control portion comprising a CPU, a memory, etc., and transmits control signals to respective components or portions of the image forming apparatus 10 according to an input operation to the operation unit 18 by the user so as to make the image forming apparatus 10 perform various kinds of operations or actions.

Subsequently, with reference to FIG. 5 and FIG. 6 together with FIG. 1-FIG. 4, specific structure of the operation unit 18 and a front end portion (housing projection portion 24a) to which this operation unit 18 is attached of the housing 24 of the image reading portion 14 will be described.

The operation unit 18 is formed in a shape of a substantially rectangle plate laterally long. A breadth (a length of a left-right direction) of the operation unit 18 is, for example, set at half or approximately half a size of a breadth of the housing 24 of the image reading portion 14, and the operation unit 18 is arranged on a front right side of the housing 24. However, a size of the operation unit 18 is changeable suitably according to a size of a touch panel display 50 that is mounted thereon, and it is not limited especially. Furthermore, the operation unit 18 is provided with being slightly inclined front-downwardly so that a user can easily see an upper surface thereof. The touch panel display 50 and a home key 52 are provided in the upper surface of this operation unit 18.

The touch panel display 50 is a touch panel integrated type liquid crystal display that is constructed by laminating a transparent electrode etc. on a liquid crystal display panel, and is provided in a region except a periphery and a right side region of the upper surface of the operation unit 18. In this first embodiment, a capacitance system is used as a detection system of a touch position of the touch panel display 50. However, other known systems such as an infrared ray cutting-off system, a surface acoustic wave system, a resistance film system, etc. can be used suitably. Software keys for receiving various setting and printing instructions, etc. by a user, a message, etc. are displayed on this touch panel display 50. As an example, a home screen for selecting a desired operation mode out of various kinds of operation modes that the image forming apparatus 10 can perform is displayed on the touch panel display 50.

The home key 52 is a hardware key of a capacitance system that detects an operation by the user based on a change of an electrostatic capacitance value, and is provided in a right side region of the touch panel display 50. The home key 52 is a key for applying instructions for shifting to the home screen, and if the home key 52 is operated by the user, the home screen will be displayed on the touch panel display 50.

In addition, a software key means a key that is reproduced on a screen by software. In contrast, a hardware key means a key (button) that is provided as a physical device.

Furthermore, the operation unit 18 can change its inclination angle with respect to the image reading portion 14. Although the operation unit 18 is essentially arranged in a basic position in a state where it is slightly inclined front-downwardly (inclination for 10 degrees, for example with respect to a horizontal direction), when the low eyes user such as a wheelchair user utilizes the image forming apparatus 10, in order to fit the user's eyes, an inclined angle is suitably changed so that the upper surface of the operation unit 18 may turn to the front side more. In this first embodiment, the operation unit 18 is made turnable about a center of a fulcrum 44 from the basic position as shown in each of drawings to a position that becomes parallel or approximately parallel to the front surface of the first coupling housing 12a by a manual operation of the user.

Figure 4:
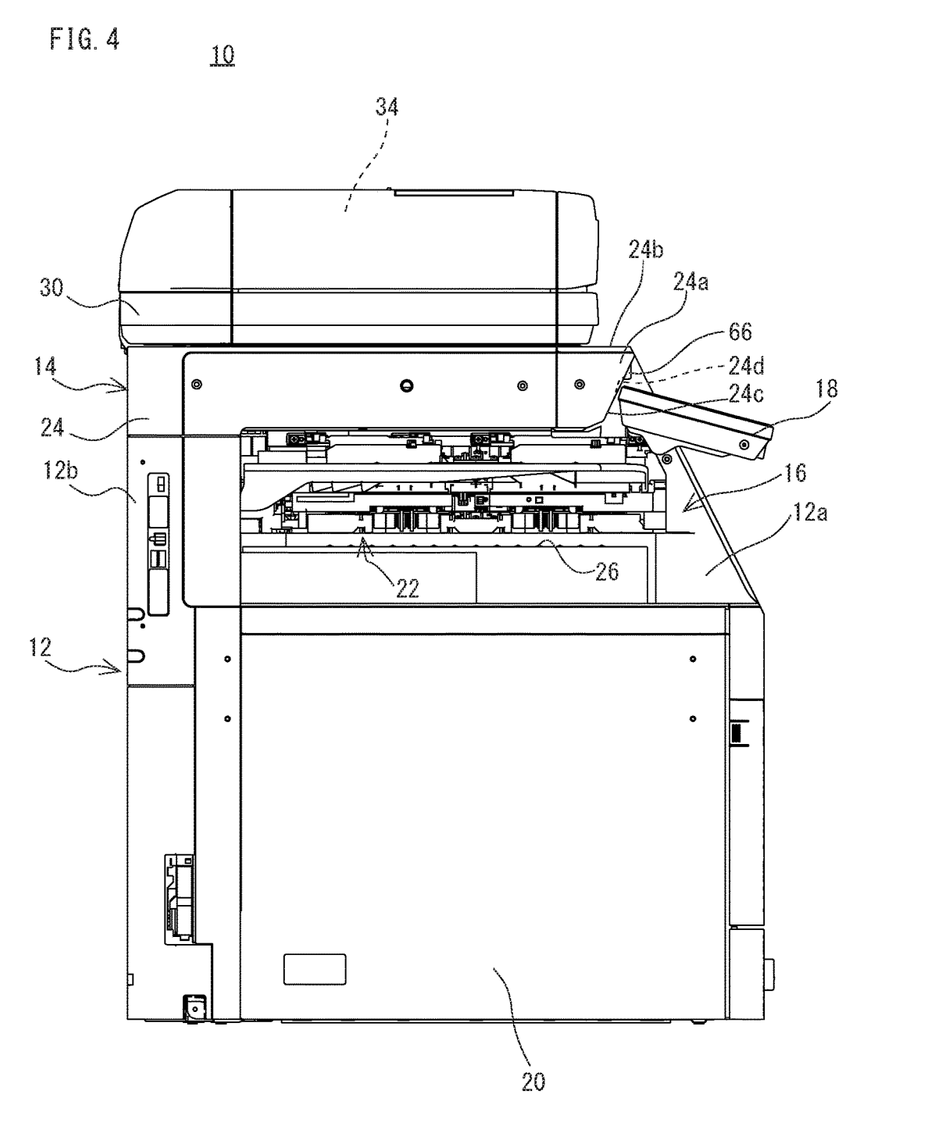
FIG. 4 is a left side view showing the image forming apparatus of FIG. 1.
Figure 6:
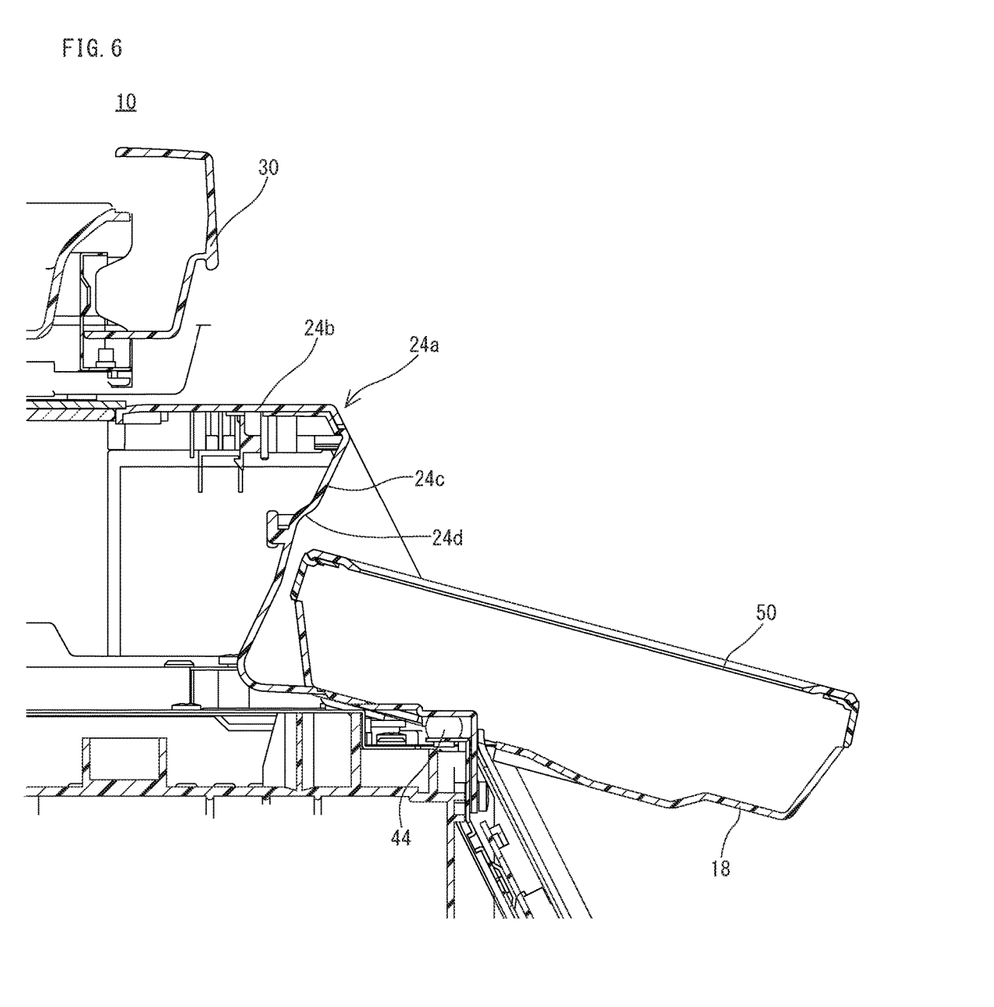
FIG. 6 is a sectional view of the operation unit peripheral part of the image forming apparatus of FIG. 1.

On the other hand, as for the housing projection portion 24a that is a front end portion of the housing 24 of the image reading portion 14, an upper surface 24b is made into a surface parallel to the document placing table, that is, the level surface as well shown in FIG. 4 and FIG. 6. Then, a level difference is formed between the upper surface 24b of the housing projection portion 24a and the upper surface of the operation unit 18, and the upper surface of the operation unit 18 is arranged in a position lower than the upper surface 24b of the housing projection portion 24a.

Furthermore, the front surface 24c of the housing projection portion 24a (i.e., the front surface of the housing 24) is made into a downwardly inclined surface that comes in a back side as it goes downward. Moreover, a depression portion 24d extended in the lateral direction is formed in the front surface 24c of the housing projection portion 24a. Then, an upper surface back end of the operation unit 18 is located in a back side as compared with an upper end of the inclined surface that is formed in the front surface 24c of the housing projection portion 24a, and a back end portion of the operation unit 18 is made to come beneath the inclined surface of the housing projection portion 24a. Moreover, the upper surface back end of the operation unit 18 is located in a back side as compared with an upper end of the depression portion 24d that is formed in the front surface 24c of the housing projection portion 24a, and the back end portion of the operation unit 18 is made to come beneath the depression portion 24d of the housing projection portion 24a (or enter an inside of the depression portion 24d).

Since the back end portion of the operation unit 18 is made to come beneath the inclined surface of the housing projection portion 24a, there occurs a feeling of unity though it is clear that the image reading portion 14 and the operation unit 18 are separate units, and accordingly, an aesthetic sense of the image forming apparatus 10 improves. Furthermore, since the back end portion of the operation unit 18 comes beneath the depression portion 24d of the housing projection portion 24a or enters into an inside of the depression portion 24d of the housing projection portion 24a, a feeling of unity of the image reading portion 14 and the operation unit 18 increases more. Moreover, since the front surface 24c of the housing projection portion 24a is formed into an inclined surface, it becomes easy to perform visual confirmation of a state of sheets stored in the in-barrel sheet discharge portion 16, and easy to take out a sheet.

Furthermore, the housing 24 of the image reading portion 14 is constituted by assembling a plurality of housing members, and a partitioning portion 42 that is one of boundaries of the plurality of housing members is extended in a front-back direction in a center portion or an approximately center portion in the left-right direction of the upper surface 24b of the housing projection portion 24a. The operation unit 18 is arranged between this partitioning portion 42 and a right end of the housing 24 (housing projection portion 24a). Accordingly, it becomes easy for the user to recognize the operation unit 18.

Then, in this first embodiment, a power key 54 is provided to the upper surface 24b of this housing projection portion 24a. The power key 54 is a mechanical hardware key that detects an operation of the user based on a change of a state of a mechanical contact, and is an operation key for turning a power supply of the image forming apparatus 10 on/off.

Figure 2:
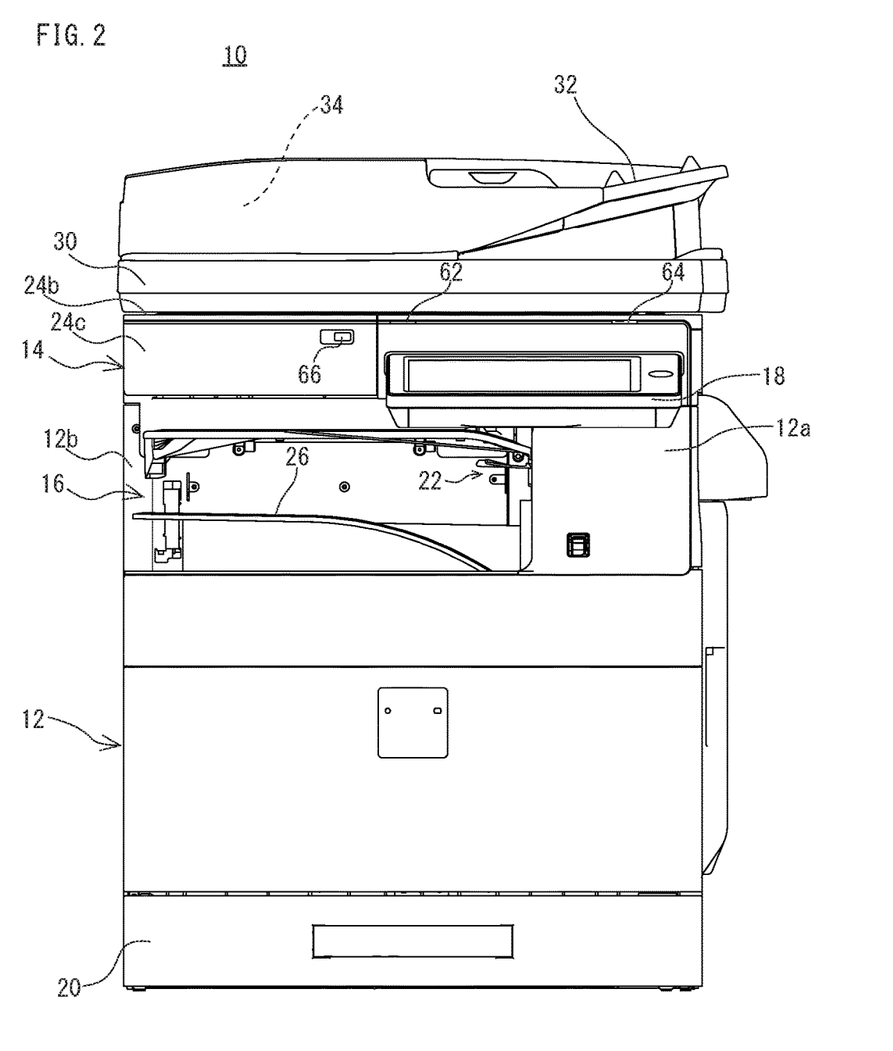
FIG. 2 is a front elevational view showing the image forming apparatus of FIG. 1.
Figure 3:
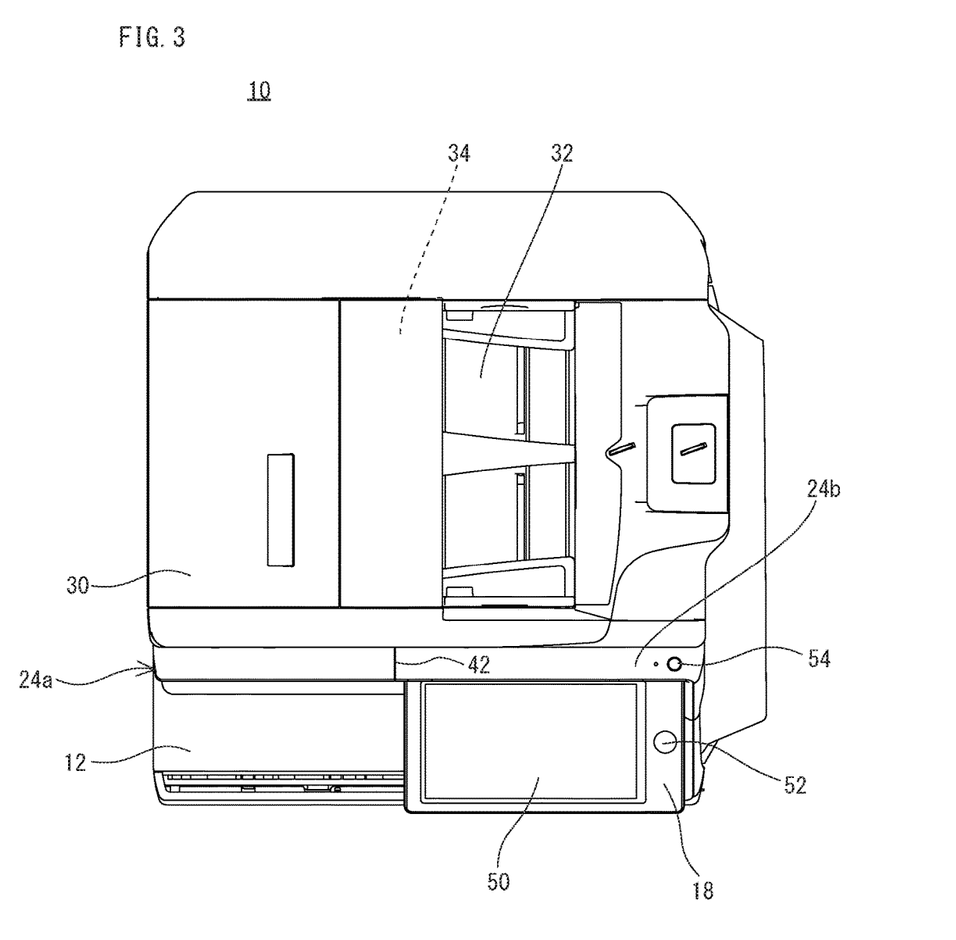
FIG. 3 is a top plan view showing the image forming apparatus of FIG. 1.
Figure 5:
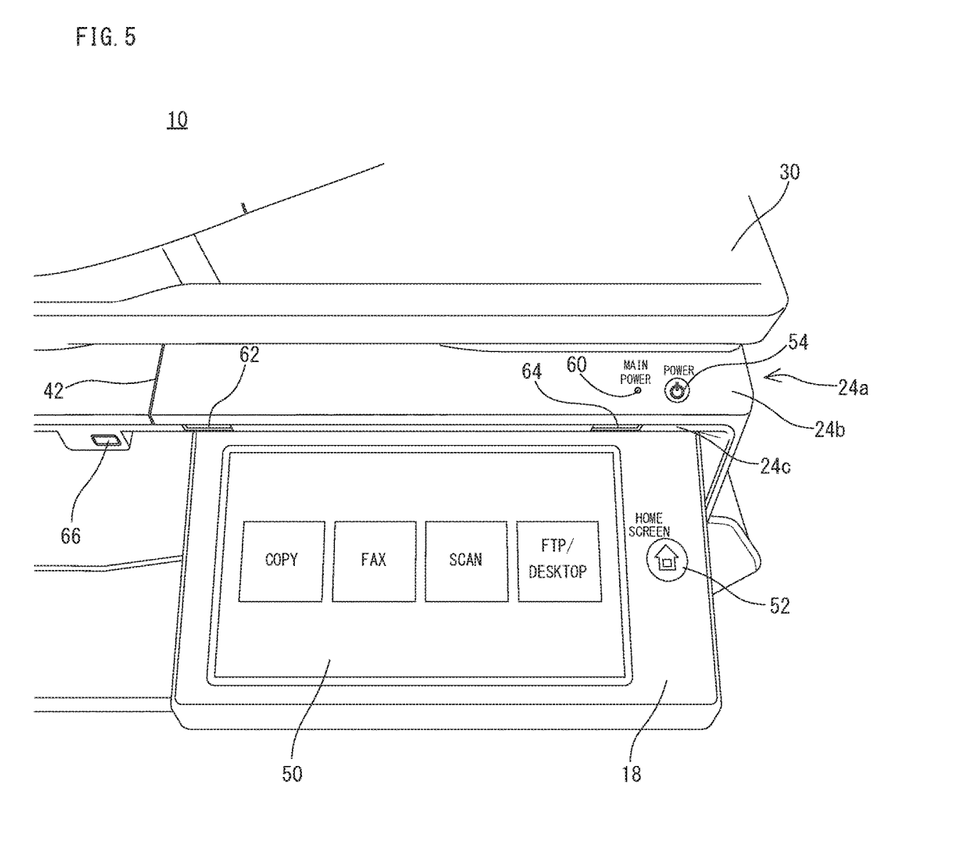
FIG. 5 is a perspective view showing a manner viewing an operation unit peripheral part of the image forming apparatus of FIG. 1 from front-obliquely above.

Here, in this first embodiment, as well shown in FIG. 2 and FIG. 5, the power key 54 is provided in a back side as compared with the touch panel display 50 and within a range of a breadth of the operation unit 18. More specifically, the power key 54 is provided in a right end portion of the upper surface 24b of the housing projection portion 24a, and the power key 54 and the home key 52 that is a hardware key provided in the operation unit 18 are arranged in line in the front-back direction.

Thus, the housing projection portion 24a is formed in the housing 24 of the image reading portion 14, and the power key 54 is provided on the upper surface 24b thereof, and other operation keys such as the touch panel display 50 etc. are provided on the operation unit 18 that is a separate unit from the image reading portion 14, and therefore, it becomes easy for the user to recognize importance of the power key 54. Therefore, it is possible to prevent the power key 54 from being operated carelessly. Furthermore, by providing the power key 54 in the back side as compared with the touch panel display 50 and within the range of the breadth of the operation unit 18, the power key 54 comes to be located on a front side of the line of sight direction of the user, and thus, to easily enter the effective field of view of the user. Therefore, it becomes easy for the user to recognize (visually confirm) a position of the power key 54.

Furthermore, by providing the power key 54 to the upper surface 24b that is the level surface of the housing projection portion 24a while providing other operation keys such as the touch panel display 50 etc. to the upper surface that is the inclined surface of the operation unit 18, that is, by arranging the power key 54 and other operation keys by dividing into the level surface and the inclined surface, it becomes easier for the user to recognize the importance of the power key 54 more. Therefore, it is possible to more surely prevent the power key 54 from being operated carelessly. However, the upper surface 24b of the housing projection portion 24a does not necessarily need to be the level surface. If the upper surface of the operation unit 18 is an inclined surface that is inclined front-downwardly with respect to the upper surface 24b of the housing projection portion 24a, that is, if a surface that other operation keys such as the touch panel display 50 etc. are provided is inclined with respect to the surface that the power key 54 is provided, (if arranging angles thereof are different from each other), it is possible to obtain the same effect.

Moreover, by forming the level difference between the upper surface 24b of the housing projection portion 24a and the upper surface of the operation unit 18, it becomes easier for the user to recognize the importance of the power key 54 more. Furthermore, the power key 54 is prevented from being operated carelessly in a series of flows to operate other operation keys on the operation unit 18 because of interference by this level difference. Therefore, it is possible to more surely prevent the power key 54 from being operated carelessly.

Moreover, it becomes easier for the user to recognize the position of the power key 54 by arranging hardware keys (the home key 52 and the power key 54) in line in the front-back direction. Furthermore, by providing the power key 54 in the right end portion of the upper surface 24b of the housing projection portion 24a, the power key 54 becomes easy to be operated by the user, and the power key 54 does not become an obstacle at the time of performing action or operation of others, like the user opens the document pressing cover 30.

Furthermore, as well shown in FIG. 5, an LED lamp 60 is provided in the upper surface 24b of the housing projection portion 24a in the immediate left of the power key 54. When the power supply of the image forming apparatus 10 is in an on-state, this LED lamp 60 is turned on.

Moreover, a FAX receiving situation indicator 62, an alarm indicator 64 and a USB connector 66 are provided in an upper end portion of the front surface 24c of the housing projection portion 24a. Here, in this first embodiment, the FAX receiving situation indicator 62 and the alarm indicator 64 are also provided in a back side as compared with the touch panel display 50 and within the range of the breadth of the operation unit 18. Accordingly, the FAX receiving situation indicator 62 and the alarm indicator 64 come to be located on the front side of the line of sight direction of the user, and thus, to easily enter the effective field of view of the user. Therefore, it becomes easy for the user to recognize that the FAX receiving situation indicator 62 and/or the alarm indicator 64 are being lighted when operating the operation unit 18. Furthermore, by separately arranging the FAX receiving situation indicator 62 and the alarm indicator 64 on both end portions within the breadth of the operation unit 18, it becomes easy for the user to grasp a situation of the image forming apparatus 10 even from a position away from the image forming apparatus 10.

As described above, according to this first embodiment, it is possible to prevent the power key 54 from being operated carelessly, and it becomes easy to recognize the position of the power key 54. That is, although various kinds of operation keys are collectively arranged in neighborhood positions, it is possible to prevent the power key 54 from being operated accidentally. Therefore, operability of the image forming apparatus 10 improves.

Second Embodiment

Next, with reference to FIG. 7, an image forming apparatus 10 of the second embodiment according to the present invention will be described. This second embodiment is different from the above-described first embodiment in a point that the operation unit 18 comprises a power saving mode key 56. Since structure of other portions is not changed, by applying the same reference numerals to portions which are common in the above-mentioned first embodiment, a duplicate description is omitted or simplified.

Figure 7:
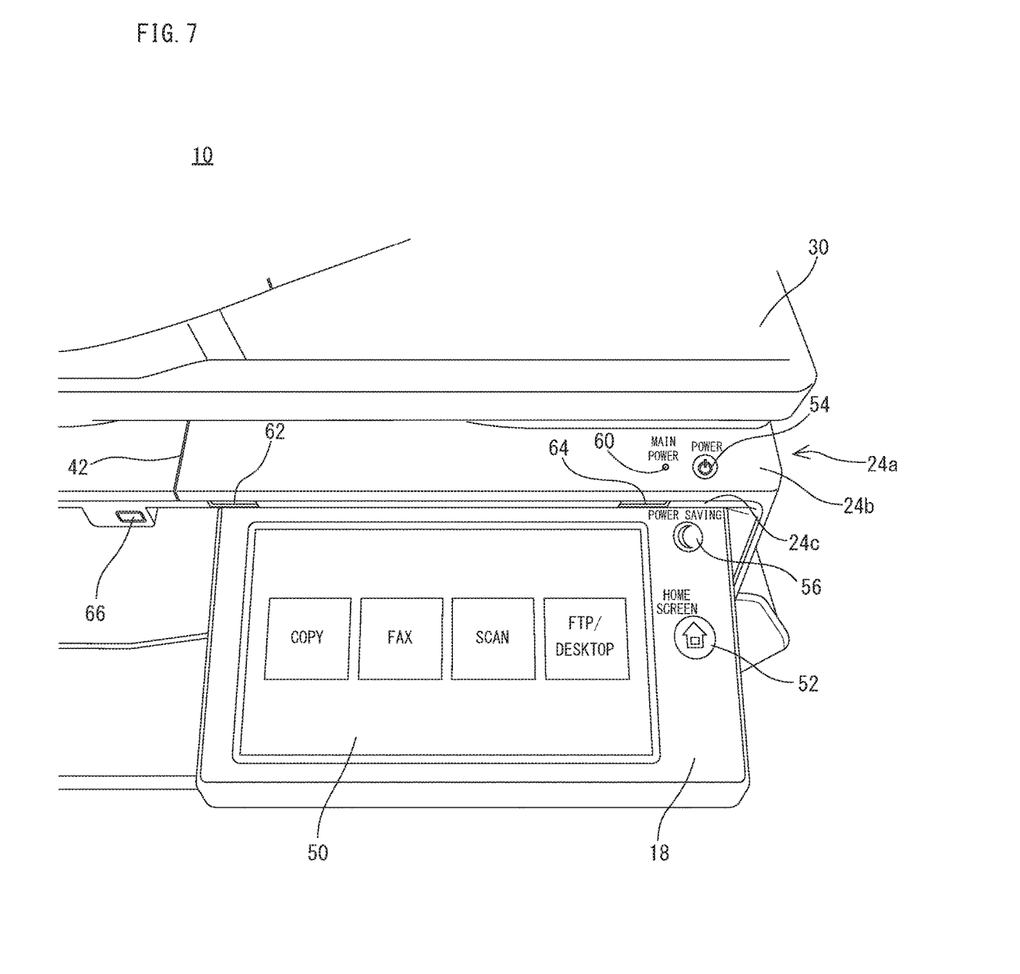
FIG. 7 is a perspective view showing a manner viewing an operation unit peripheral part of an image forming apparatus of a second embodiment according to the present invention from front-obliquely above.

In this second embodiment, as shown in FIG. 7, in the upper surface of the operation unit 18, there are provided with the power saving mode key 56 as well as the touch panel display 50 and the home key 52.

The power saving mode key 56 is a hardware key of a capacitance system that detects an operation of the user based on a change of electrostatic capacitance, and is provided in a region in a right back side of the upper surface of the operation unit 18. The power saving mode key 56 is an operation key for instructing to shift from a normal mode to a power saving mode or vice versa. In addition, the shift to the power saving mode is performed not only when the power saving mode key 56 is depressed but when a predetermined time period elapses in a state where there is no input operation by a user. Here, the normal mode means a state where the power supply is turned on and all the operation modes can be performed. The power saving mode means a state where the power supply is turned on and only a part of operation modes can be performed.

On the other hand, the power key 54 that is a mechanical hardware key is provided in the upper surface 24b of the housing projection portion 24a of the image reading portion 14 in a back side as compared with the touch panel display 50 and within the range of the breadth of the operation unit 18.

Here, in this second embodiment, the home key 52, the power saving mode key 56 and the power key 54 are arranged in line in the front-back direction in this order from the front side. Furthermore, sizes of respective operation keys are made larger in an order of the home key 52, the power saving mode key 56 and the power key 54. This is because the home key 52, the power saving mode key 56 and the power key 54 have operation frequencies that become higher in this order, and priorities must be prevented from being depressed are low in this order.

According to this second embodiment, like the first embodiment, it is possible to prevent the power key 54 from being operated carelessly, and it becomes easy to recognize the position of the power key 54. Therefore, operability of the image forming apparatus 10 improves.

Third Embodiment

Subsequently, with reference to FIG. 8, an image forming apparatus 10 of the third embodiment according to the present invention will be described. The third embodiment is different from the above-described first embodiment in a point that the housing 24 of the image reading portion 14 comprises a power saving mode key 56. Since structure of other portions is not changed, by applying the same reference numerals to portions which are common in the above-mentioned first embodiment, a duplicate description is omitted or simplified.

Figure 8:
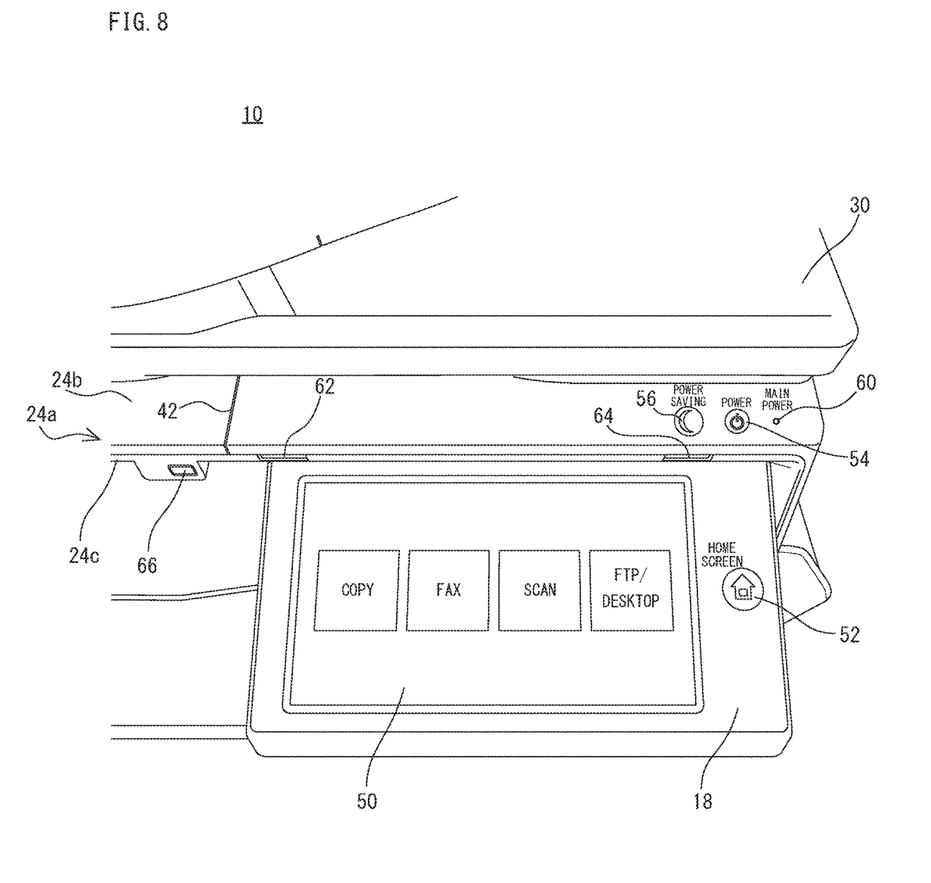
FIG. 8 is a perspective view showing a manner viewing an operation unit peripheral part of an image forming apparatus of a third embodiment according to the present invention from front-obliquely above.

In this third embodiment, as shown in FIG. 8, the touch panel display 50 and the home key 52 are provided in the upper surface of the operation unit 18.

On the other hand, in the upper surface 24b of the housing projection portion 24a of the image reading portion 14, the power key 54 as well as the power saving mode key 56 that is a mechanical hardware key are provided in back side as compared with the touch panel display 50 and within the range of the breadth of the operation unit 18. Specifically, the power saving mode key 56 is provided in a region on the immediate left of the power key 54.

According to this third embodiment, like the first embodiment, it is possible to prevent the power key 54 from being operated carelessly, and it becomes easy to recognize the position of the power key 54. Similarly, it is possible to prevent the power saving mode key 56 from being operated carelessly, and it becomes easy to recognize a position of the power saving mode key 56. Therefore, the operability of the image forming apparatus 10 improves.

In addition, although the hardware key that is provided on the upper surface of the operation unit 18 (the home key 52 or the power saving mode key 56) is of a capacitance type in each of the above-described embodiments, the hardware key to be provided on the upper surface of the operation unit 18 does not necessarily need to be a capacitance type, and may be a mechanical hardware key.

Furthermore, although the front surface 24c of the housing 24 is made into an inclined surface that is inclined downwardly in each of the above-described embodiments, it does not need to necessarily make the front surface 24c of the housing 24 into a downwardly inclined surface, may be a vertical surface. Furthermore, a part of the front surface 24c may be a downwardly inclined surface. Moreover, although the front surface 24c of the housing 24 is made into the downwardly inclined surface and the depression portion 24d is formed in the front surface 24c thereof in each of the above-described embodiments, it is sufficient that the front surface 24c of the housing 24 has either one of the inclined surface and the depression portion 24d. Then, when the back end portion of the operation unit 18 comes beneath either one of the inclined surface and the depression portion 24d of the front 24c of the housing 24, it is possible to produce a feeling of unity though it is clear that the image reading portion 14 and the operation unit 18 are separate units.

Furthermore, although the operation unit 18 is made tiltable to a desired angle in each of the above-described embodiments, the operation unit 18 does not necessarily need to be tiltable. Furthermore, although an angle of the operation unit 18 is manually changed by the user, it does not need to be limited to this. For example, it is also possible to have a configuration that an angle change of the operation unit 18 is performed by an electric according to a key operation etc. by the user.

Moreover, although the operation unit 18 is arranged on the front right side of the housing 24 in each of the above-described embodiments, it does not need to be limited to this. For example, the operation unit 18 may be arranged on the front left side of the housing 24, and may be arranged in the front center of the housing 24.

Moreover, although the power key 54 is made to completely enter within the range of the breadth of the operation unit 18 in each of the above-described embodiments, the power key 54 may be arranged so as to some protrudes from the range of the breadth of the operation unit 18. That is, providing the power key 54 within the range of the breadth of the operation unit 18 includes a state where at least a part of the power key 54 enters within the range of the breadth of the operation unit 18.

Furthermore, although the multifunction peripheral combining a copying machine, a facsimile, a printer, etc. is shown as the image forming apparatus 10 in each of the above-described embodiments, the image forming apparatuses 10 may be either a copying machine, a facsimile, a printer, etc. and a multifunction peripheral combining at least two of them. Furthermore, the image forming apparatus 10 does not necessarily need to be an in-barrel sheet discharge type.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus, comprising:
    an image reading portion;
    a document pressing cover that is openably provided on an upper surface of the image reading portion;
    a housing projection portion that is formed on a housing of the image reading portion so as to be projected outside as compared with the document pressing cover when viewed from a top side of the image forming apparatus;
    a display; and
    at least one of a power key and a power saving key that are hardware keys and provided on an upper surface of the housing projection portion in a back side as compared with the display.

2. The image forming apparatus according to claim 1, wherein the at least one of the power key and the power saving key are provided within a range of a breadth of the display.

3. The image forming apparatus according to claim 1, comprising at least one of a fax receiving situation indicator and an alarm indicator provided on the housing projection portion.

4. The image forming apparatus according to claim 1, wherein the upper surface of the housing projection portion is a level surface.

5. The image forming apparatus according to claim 1, comprising another hardware key, wherein the at least one of the power key and the power saving key and the another hardware key are arranged in line in a front-back direction.

6. The image forming apparatus according to claim 1, comprising at least one of a fax receiving situation indicator and an alarm indicator provided in a back side as compared with the display.

* * * * *